April 29, 1924.  
F. W. BURGER ET AL  
BEARING AND METHOD OF MAKING SAME  
Filed Feb. 27, 1922  4 Sheets-Sheet 1
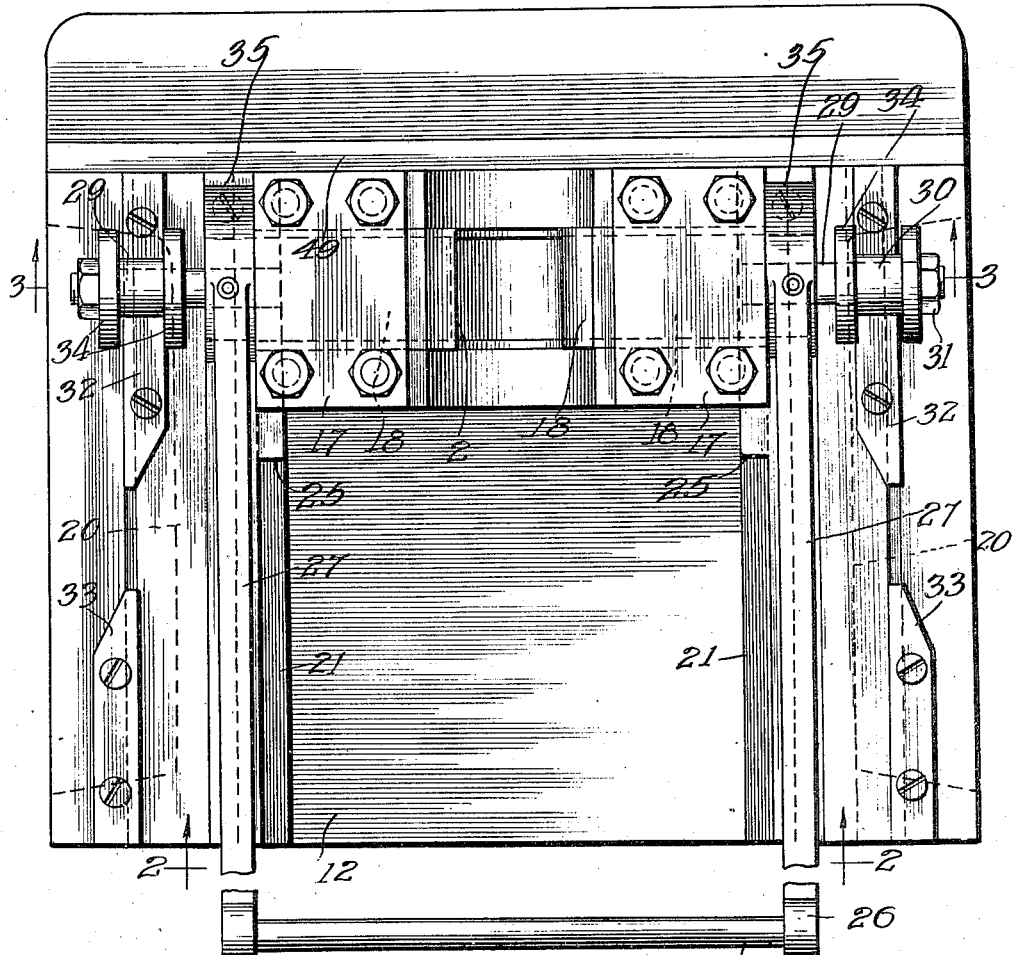
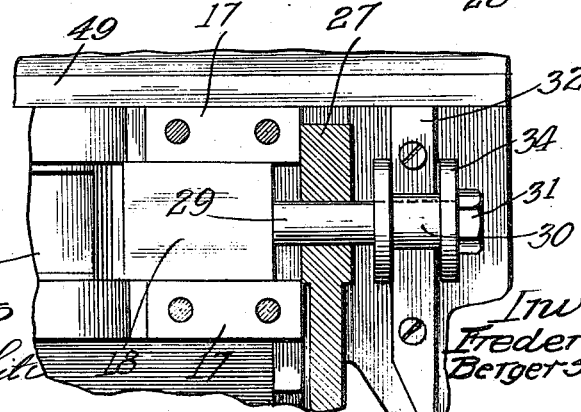

April 29, 1924.
F. W. BURGER ET AL
1,492,119
BEARING AND METHOD OF MAKING SAME
Filed Feb. 27, 1922   4 Sheets-Sheet 2
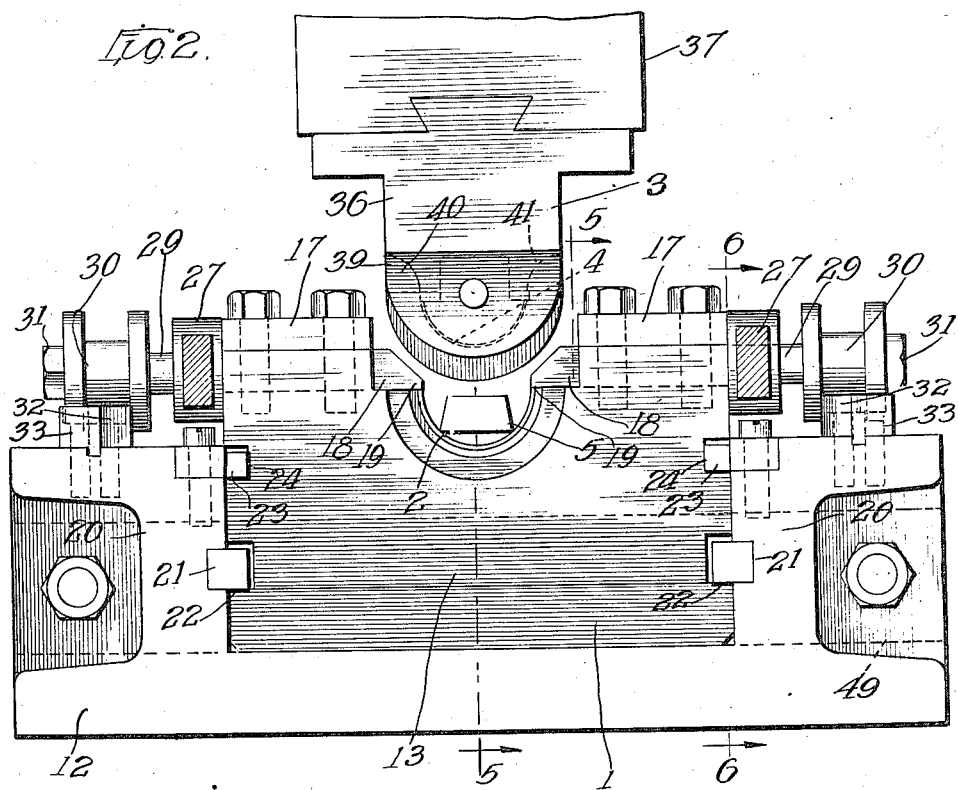
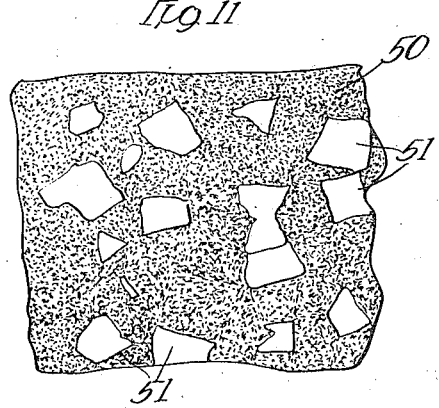
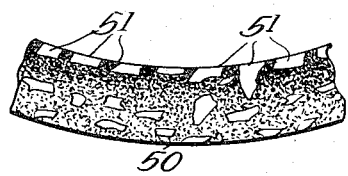

April 29, 1924.
F. W. BURGER ET AL
BEARING AND METHOD OF MAKING SAME
Filed Feb. 27, 1922    4 Sheets-Sheet 3
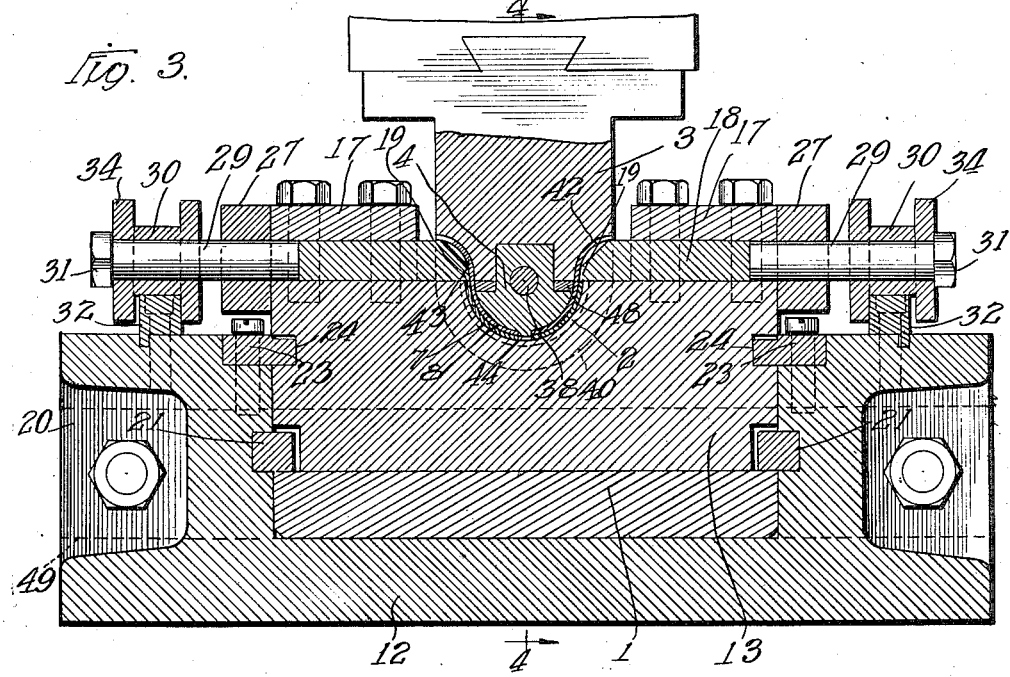
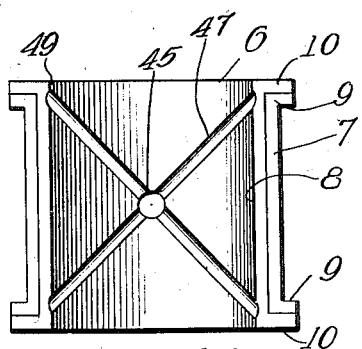
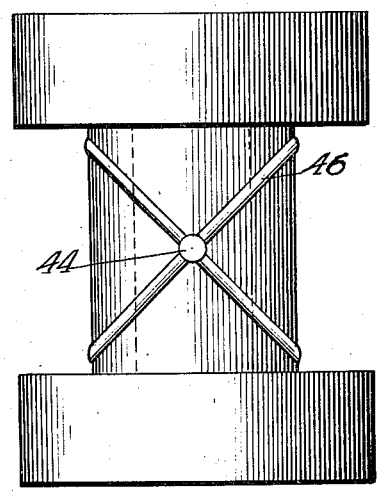
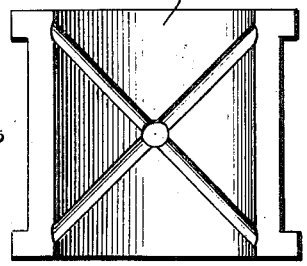
Witnesses
Harry R. L. White
W. P. Kilroy
Inventors
Frederick W. Burger
Berger Stockfleth
By Murray, Lotz & Wilson Attys.

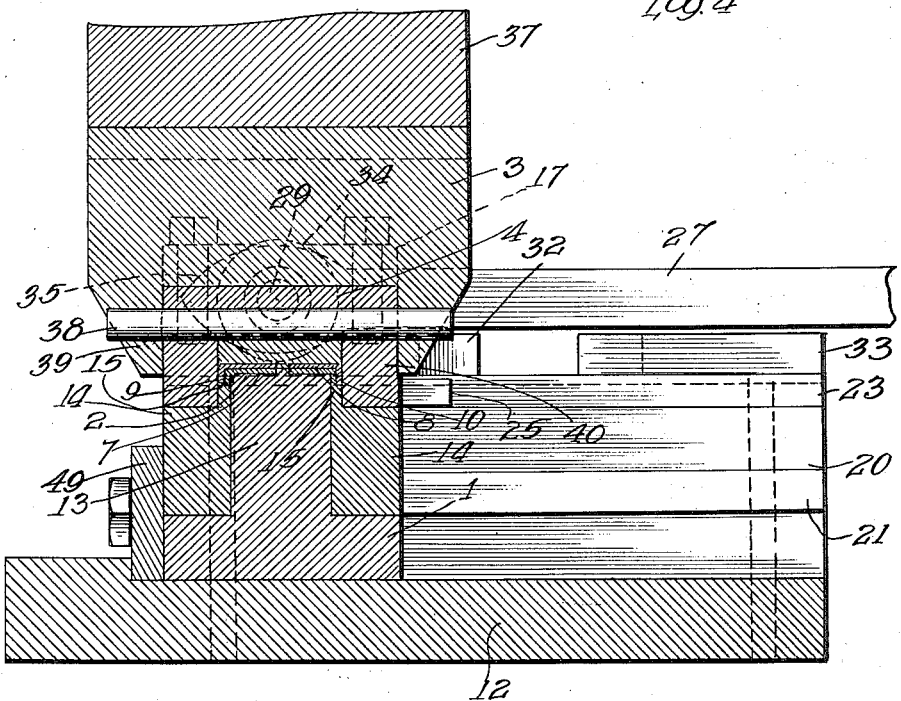

Patented Apr. 29, 1924.

1,492,119

UNITED STATES PATENT OFFICE.

FREDERICK W. BURGER, OF RIVERSIDE, AND BERGER STOCKFLETH, OF CHICAGO, ILLINOIS.

BEARING AND METHOD OF MAKING SAME.

Application filed February 27, 1922. Serial No. 539,550.

*To all whom it may concern:*

Be it known that we, FREDERICK W. BURGER and BERGER STOCKFLETH, citizens of the United States, and residents of Riverside and Chicago, respectively, in the county of Cook and State of Illinois, have invented certain new and useful Improvements in a Bearing and Method of Making Same, of which the following is a specification.

Our invention relates to improved bearings and methods and means for making same and has special reference to Babbitt metal bearings or liners for bearings.

Our object is to reduce the cost and to increase the durability and wearing qualities of such bearings or bearing linings.

Babbitt metal is a term applied to a relatively soft bearing metal, the composition of which may vary considerably. There are however two main divisions, one being known as the lead base metal and another the tin base metal, and while both kinds have structural qualities in common there is considerable difference in the practical use of the two.

Each consists of a relatively soft matrix or base in which is embedded a plurality of tin antimonoid crystals which are relatively hard and which provide the desired wearing qualities of the bearings.

Babbitt metal is commonly produced at the smelters in pig form and under such conditions as to produce the size and distribution of the tin antimonoid crystals desired. This is true of both the lead and the tin base babbitts.

It is well known, in the art, that upon the remelting of the virgin or original babbitt it is difficult, if not impossible, to retain the number, size and distribution of the tin antimonoid crystals and that the metal in such remelting loses more or less of its tin and other metals which are more readily vaporized or burned out. Consequently the quality of the metal after having been remelted is not the same as the original metal and bearings or liners made from such remelted babbitt are not bearings containing metal of the exact constitutents and structure as that so carefully produced at the smelters in the production of the virgin babbitt.

It is no doubt true that by careful manipulation as to melting and cooling, nearly the original quality of the babbitt metal may be produced from the remelted metal as was produced in the first instance. A number of factors however, militate against this result in practice. The production and distribution of the hard antimonoid crystals depends largely upon the temperature of the melted metal and its rate of cooling as well as upon the mass of metal which is produced in one body. All of these factors have been very carefully and scientifically worked out in the smelting operations where large quanities of the metal are produced and on the other hand all of these factors are difficult or impossible to control accurately when the metal is remelted for the production of bearings.

It is extremely doubtful whether it would be possible at the smelter to produce the relatively thin linings for bearings directly from the melted virgin metal and have the metal in such linings of equal quality with that produced in pig form for the reason that the cooling of the metal in the smaller masses would, as shown by our investigations, result in a different crystalline structure.

It is an important feature of our invention that we are enabled to produce Babbitt metal bearing linings either with or without harder metal backings and in which the original crystalline structure or rather the original size and distribution of the relatively hard tin antimonoid crystals is preserved as well as the original proportions of the various metals which make up the babbitt.

In our method of producing such bearings we do not heat the metal to a point where the crystals are destroyed or to a point at which the matrix whether of lead or tin will permit the crystals to flow freely and of course this temperature is considerably below that necessary to melt or destroy the crystals. The temperature to which we heat the metal is only high enough to permit the mass of metal to be changed in shape under pressure without producing insipient fissures or otherwise breaking down the original structure.

Our method is very simple. We provide a cooperating die and plunger and we heat a mass of the metal to a suitable temperature, if a lead base, this temperature being approximately 250 to 300 degrees Fahrenheit and if a tin base, being approximately 300 to 400 degrees Fahrenheit. We place this mass of metal which is slightly more in quantity than sufficient to make one article and then we force the punch into the die or in other words close the mold with great pressure and the malleable metal is forced to completely fill the mold under the tremendous pressure used.

If a harder metal backing is desired we prepare a suitable back of a suitable metal such as steel, brass or bronze and first tin the inner surface of the backing, then place it in the mold with the mass of heated Babbitt metal within the backing, then upon closing the mold, the Babbitt metal is forced to completely fill the mold, that is the space unoccupied by the back and the tremendous pressure applied causes the Babbitt metal to adhere or weld to the tinned inner surface of the back. The result is a unitary structure comprising a bearing having a Babbitt metal lining supported by a harder metal back.

It should be understood that the above is typical of our invention being only one way in which the original structure of the Babbitt metal can be preserved in the finished product.

It might be conceived that as the original Babbitt metal was cooling and having reached a temperature at which the tin antimonoid crystals had been formed and the matrix or base had lost its fluidity that at such time the metal could be formed under pressure into the articles desired such as bearing linings and it is believed that we are entitled to claims having such a scope. Our preferred process outlined above seems to be practical of application to general manufacturing conditions and we have chosen to illustrate and describe in detail such a method so that our invention may be more clearly understood.

In the accompanying drawings forming part of this specification we have illustrated a typical method of practicing our invention and we have shown examples of our improved bearing linings both with and without harder metal backs, and in said drawings:

Figure 1 is a fragmentary top elevation of a die mechanism which we have found best adapted for use in producing bearings in accordance with our improved method;

Figure 2 is a vertical sectional view of the press on the line 2—2 of Figure 1 and showing a front elevation of the die and punch mechanism;

Figure 3 is a fragmentary vertical sectional view on the line 3—3 of Figure 1;

Figure 4 is a vertical sectional view at right angles to Figure 3 taken on the line 4—4 of Figure 3;

Figures 5 and 6 are vertical sectional views on the lines 5—5 and 6—6 respectively of Figure 2;

Figure 7 is a fragmentary plan section on the line 7—7 of Figure 2;

Figure 8 is a top plan view of a bearing having a backing and such as would be produced in the press illustrated;

Figure 9 is a similar view of a bearing made entirely of Babbitt metal;

Figure 10 is a bottom plan view of the punch;

Figure 11 is a section of a fragment of Babbitt metal shown as it would appear under a microscope enlarging the section to 75 diameters; and Figure 12 is a fragmentary cross sectional view of a bearing formed in accordance with our invention and enlarged substantially 30 diameters.

The device which we have found best suited for practicing our invention comprises an ordinary punch or pressure press. In the drawings, we have only illustrated the special parts which we have to add to an ordinary press to practice our invention. The really essential parts comprise a die member 1 having a die space 2 formed therein of the shape and conformity of the outer surface of the bearing to be produced and a cooperating punch member 3 having an operating surface 4 adapted to cooperate with the die space 2 when brought to closed position as illustrated in Figure 4 to cause a fragment or block of the Babbitt metal 5, see Figure 2, to assume the shape desired. This desired shape is best shown in Figures 8 and 9. In Figure 8 we have illustrated a half-bearing 6 composed of an outer semi-cylindrical backing 7 and an inner Babbitt metal lining 8. Preferably the backing has narrow outwardly extending circumferential flanges 9 at its ends and the Babbitt metal is formed to cover the outer surfaces of these flanges as shown at 10.

In Figure 9 we have illustrated a bearing lining 11 similar to that shown in Figure 8 except that the whole article is made of Babbitt metal instead of a harder backing covered by an inner babbitt surface.

The member 1 is mounted upon a suitable bed plate member 12 and is adapted to be moved from front to back of the press to position the die 2 below the punch 3 at the inner limit of its movement and at the other to be withdrawn from the punch toward the front of the machine so that the formed bearing can be removed from the die.

As best shown in Figure 4 the die cavity 3 is mainly formed in the upper surface of a central member 13 being a part of the die member 1 and at each side, that is at the forward and rear sides of this central member 3 are cross-bars 14 being part of the die member 1. Each of these cross-bars has a flange 15 the upper edge 16 of which forms that portion of the die in which the flanges 10 of the bearings are formed. These crossbars 14 are clamped or bound together by plates 17 and bolts 18 which extend across the upper surface of the ends of the projection 13 as best shown in Figure 1.

For the purpose of substantially closing the die at the upper edges of the bearing we provide laterally moving plungers 18, the inner ends 19 of which are adapted to be projected toward each other, that is toward the center of the die a sufficient distance to cause them to close the top of the mold space. These plungers are guided on top of the top surface of the part 13 of the die and beneath the tie plates 17 and are adapted to be moved out and in, that is transversely of the die mechanism as the die is moved back and forth on the base plate 12. As best shown in Figure 2 the base 12 has side members 20 which rise at either side of the die mechanism and guide the member 1 at its back and forth movement. These side members carry inner guides 21 which project into grooves 22 in the sides of the member 13 and prevent this member from being lifted up.

In addition to the guides 21 we provide guides 23 carried at the upper edges of the side parts 20 and which enter guide grooves 24 in the side members 14 of the die mechanism. These guides 23 are adapted to hold the sides 14 from rising when the die is arranged beneath the punch member and terminate at 25 Figure 1 so that when the die mechanism is drawn forward they can be lifted up to forcibly lift the bearing which has just been formed, engaging the bearing by the flanges and forcing it upwardly free of the die space 2. For effecting the movement of the die member back and forth on the base plate 12 we provide a yoke member 26 having side arms 27 connected by a cross-bar 28. The rear ends of the side arms are mounted upon horizontal shafts 29 extending outwardly from the outer ends of the plungers 18. These shafts 29 extend beyond the side arms 27 and carry cam spools 30 on their outer ends, these spools being held against removal from the shafts by suitable nuts 31.

Upon the top surface of the side parts 20 of the base plate 1, we provide cam bars 32 and 33 adapted to enter between flanges 34 on the cam spools 29 and as the die member is moved outwardly to cause the plungers 18 to be withdrawn from their inner operating positions and as the die mechanism is moved inwardly to position the die in working relation to the punch, these cam bars serve to cause the plungers 18 to be forced inwardly to operating position. The inner ends 35 of the side bars 27 of the yoke 26 are formed into lifting projections extending rearwardly from the shafts 29 and when the die mechanism has been fully withdrawn the lifting of the handle end 28 of the yoke serves to lift the cross bars 14 through the medium of the plungers 18 and the tie plates 17 and whereby the bearing which has just been cast can be forced out of the die, the plungers 18 at this time having been withdrawn from their positions where the inners ends extend over the edges of the bearing.

The plunger or punch 3 comprises a main member or casting 36 adapted to be removably secured to the vertically movable head 37 of the press upon which the die mechanism is used. This head 37 is adapted to be reciprocated up and down and force the plunger down into the die member 2 with force sufficient to form the mass of metal 5 into the space provided between the plunger and the die to produce the bearing. The block 4 is adapted to be secured to the member 3 by a horizontal pin 38 which extends through depending portions 39 between which the block 4 is received, the pin 38 preferably being arranged in axial aligment with the center line of the bearing sleeve to be produced. The forming block 4 is provided with depending end portions 40 which are spread apart the length of the bearing to be produced and when closed upon the die, these depending portions 40 descend and engage the outer faces of the upwardly extending flanges 15 on the members 14 thus tightly closing the ends of the space in which the bearing is formed. As best shown in Figure 4, the lower longitudinal sides of the part 3 of the plunger are cut away as shown at 41 to provide spaces 42 adjacent the inner ends 19 of the transverse plungers 18 into which any surplus metal can be forced. As the plunger descends and forms the metal into the die space the pressure will be relieved and the destruction of the mechanism prevented by allowing the excess metal to exude into the spaces 42.

In the formation of the bearing, the surplus metal, shown at 43, adheres to the bearing and is severed from the bearing in a following operation which it is not deemed necessary to describe herein.

Preferably the plunger member is provided with a center button or projection 44 on its under side adapted to produce an oil hole or opening 45 in the bearing and the plunger is preferably provided with diagonally arranged rounded ridges 46 for producing diagonal oil grooves 47 in the bearing. Furthermore we preferably provide strips or bars 48 in the plunger member at the upper side edges of the bearing adapted to produce longitudinal cut away portions or oil grooves 49 at the upper longitudinal edges of the bearing produced.

In fact the bearing when it leaves the press is ready for use without further operations except merely the removal of the surplus or excess metal 43 which can be accomplished by means of suitable simple cuting devices.

In our method of producing bearings, if the bearing is to have a hard metal backing we first form the hard metal backing 7 preferably cut of sheet metal by means of suitable forming dies and then we coat the inner cylindrical surface of the backing and the outer end surfaces of the flanges 9 with some softer adhering metal such as a suitable solder. Then when the die member is withdrawn from beneath the plunger, as has been described, the backing is laid in the die member in the proper position, the end flanges 9 engaging the outer sides of the center projection 13. Then a piece 5 of the Babbitt metal, previously heated as has been described to make it malleable, is placed in the die upon the backing already in position. Then the die mechanism is pushed in under the plunger and is adapted to be set in central position by means of a rear stop 49 secured to the base plate 12. During the forcing inwardly of the die mechanism the transverse plungers 18 are forced toward each other and engage over the upper edges of the backing thereby holding it accurately in central and true position. Then the plunger is forced downwardly into the die and the mass of Babbitt metal 5 is formed by means of the heavy pressure into the space between the plunger and the die, that is the plunger and the backing when the backing is used and in this operation under the tremendous pressure required the metal is compacted and caused to adhere to the inner prepared surface of the backing so that when the bearing is removed, the backing and the Babbitt metal lining constitutes a unitary member, the Babbitt metal being molecularly joined to the backing through the medium of the solder coating on the backing.

In some instances it is desired to make bearing linings of Babbitt metal only without the hard metal backing and for this purpose the operation is substantially the same except that the harder metal backing is omitted and a larger mass of the Babbitt metal is used, being sufficient to form the complete bearing of Babbitt metal.

In Figures 11 and 12 we have illustrated the peculiar structure of Babbitt metal and the particular advantage of our method of forming bearings in relation to this structure.

Figure 11 is a very much enlarged section, practically .75 diameters, of virgin Babbitt metal the matrix 50 being formed of lead or zinc as the case may be, depending upon the kind of babbitt used, and the tin antimonoid crystals 51 being shown as distributed throughout the matrix. The section shown is a reproduction of a photograph of a section of lead babbitt.

In Figure 12 we have shown a greatly enlarged section of a babbitt bearing formed in accordance with our invention. It will be noted that the tin antimonoid crystals 51 are distributed to a somewhat greater extent over the inner curved surface of the bearing than elsewhere in the mass. This is accounted for by the fact that in the forming of the bearing in the manner described, the tin antimonoid crystals naturally lag back in the forming operation, the more malleable matrix flowing more easily into the mold. This is a desirable result as the tin antimonoid crystals form the real wearing surface and to provide an accumulation or thickening of these at the inner wearing surface of the bearing is one of the peculiar advantages of our novel method. Except for the slight change in the relative positions of the tin antimonoid crystals indicated in Figure 12 the metal used is preserved in its virgin or original condition, that is, the tin antimonoid crystals are not changed in extent or shape and the structure of the matrix is substantially the same in the finished bearing as existed in the Babbitt metal as produced in pig form at the smelters.

As many modifications of our invention will readily suggest themselves to one skilled in the art, we do not limit or confine our invention to the specific steps of procedure or to the specific details of construction herein shown and described.

We claim:

1. The method of making Babbitt metal bearings from the original babbitt "pig" which consists in pressing the metal into a mold, the metal having been previously heated only to a temperature at which the base or matrix is malleable but not fluid, as and for the purpose specified.

2. The method of making Babbitt metal bearings from lumps of original "pig" babbitt which consists in heating Babbitt metal to a malleable temperature only, then pressing the metal while so heated into a mold of the form desired.

3. The method of making a Babbitt metal bearing which consists of pressing a mass of virgin Babbitt metal into a mold, the metal being at such a temperature that the base or matrix is malleable and capable of being changed in form without the production of insipient fissures or cold-shuts and at which temperature the imbedded tin antimonoid crystals are maintained in their original form and distribution, the mass of metal and the pressure being such that the metal is forced to completely fill the mold, the metal being compacted in the operation and the babbitt being left in a unitary homogeneous and continuous mass of substantially the same structural condition as before being heated.

4. The herein described method of making a bearing with a Babbitt metal lining, which consists in providing a harder metal backing for the bearing, tinning the inner surface of the backing, heating a mass of the metal to a malleable temperature only, placing the backing in a mold and the mass of babbitt within the backing and by means of suitable mold closure means pressing the babbitt into the backing and forming it into the shape desired and causing the babbitt to adhere to the tinned inner surface by the pressure used and without heat sufficient to flow the solder.

5. A Babbitt metal bearing comprising a cylindrical shell made of Babbitt metal in which shell the size and distribution of the tin antimonoid crystals are substantially the same as when the metal was originally produced.

6. A Babbitt metal bearing in which the harder wearing crystals retain their size and substantially their distribution as when produced in the original pig.

7. A bearing comprising an inner lining of substantially virgin Babbitt metal and a backing of harder metal having a tinned inner surface, the lining being metallically and molecularly joined to the backing by reason of the pressure by which it is applied and without heat sufficient to flow any metal used.

8. A bearing comprising an inner lining of virgin Babbitt metal, a backing of harder metal, the backing and the lining joined by a layer of tin previously applied to the backing by heat, the Babbitt metal having been formed from an original lump and applied to the backing in malleable form and caused to adhere to the tin by pressure while in such condition and without the application of heat to melt the solder.

9. The method of making a Babbitt metal bearing which consists in shaping a solid mass of virgin Babbitt metal to the form of the desired bearing by pressure applied to such mass while at a malleable temperature.

10. The method of making a lined Babbitt metal bearing which consists in applying pressure to a solid mass of virgin Babbitt metal at a malleable temperature placed within a suitable bearing, and by such pressure effecting the application of the Babbitt metal to the surface to be lined.

11. The method of making an anti-friction bearing out of a material comprising a relatively soft metallic matrix having distributed throughout the same tin antimonoid crystals, which consists in shaping such material to the form of the desired bearing by pressure applied thereto while at a malleable temperature, the material having been previously subjected to no treatment which would materially affect the distribution of said crystals.

12. The herein described method of forming a bearing which consists in heating a mass of metal comprising a relatively soft metal base or matrix in which there is distributed harder particles or crystals to a point only when the base becomes malleable then pressing and forming the mass while so heated into a mold of the form desired.

13. A metal bearing comprising a suitable shell formed of metal comprising a relatively soft base or matrix in which harder particles or crystals are distributed in substantially the proportion and distribution originally occurring when the metal is first produced.

14. A metal bearing or lining in which harder wearing crystals retain their size and substantially their distribution within a softer base or matrix as when originally produced.

15. The method of making a metal bearing from virgin metal which virgin metal consists of a relative softer base or matrix in which there is substantially uniformly distributed harder particles or crystals, and which method consists in shaping a solid mass of such virgin metal to the from of the desired bearing by pressure applied thereto while the metal is at a malleable temperature.

Signed at Chicago, Illinois, this 1st day of February, 1922.

FREDERICK W. BURGER.
BERGER STOCKFLETH.